(12) United States Patent
Robinson et al.

(10) Patent No.: US 6,459,471 B2
(45) Date of Patent: Oct. 1, 2002

(54) IMAGE REPRODUCTION APPARATUS WITH COMPACT, LOW-WASTE DIGITAL PRINTER

(75) Inventors: Scott C. Robinson; Xin Wen; Mark S. Janosky, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/846,717

(22) Filed: May 1, 2001

Related U.S. Application Data

(62) Division of application No. 09/470,290, filed on Dec. 22, 1999.

(51) Int. Cl.[7] ............... G03B 27/52; G03B 27/62; H04N 1/04
(52) U.S. Cl. ............... 355/40; 355/75; 358/487
(58) Field of Search .................. 355/27–29, 40, 355/41, 54, 75, 77; 396/564, 612; 358/487

(56) References Cited

U.S. PATENT DOCUMENTS

| | | |
|---|---|---|
| 3,807,855 A | 4/1974 | Zajac |
| 3,831,478 A | 8/1974 | Wright et al. |
| 4,114,349 A | 9/1978 | Jensen et al. |
| 4,785,313 A | 11/1988 | Higuma et al. |
| 5,369,426 A | 11/1994 | Jamzadeh ............ 346/157 |
| 5,374,475 A | 12/1994 | Walchi |
| 5,376,434 A | 12/1994 | Ogawa et al. |
| 5,565,902 A | 10/1996 | Nardone et al. |
| 5,574,831 A | 11/1996 | Grenda |
| 5,576,794 A | 11/1996 | DeMarti, Jr. et al. |
| 5,752,122 A | 5/1998 | Ishikawa |
| 5,768,675 A | 6/1998 | Estabrooks |
| 5,804,341 A | 9/1998 | Bohan et al. |
| 5,847,738 A | 12/1998 | Tutt et al. |
| 5,999,276 A | 12/1999 | Narita ............ 358/487 |
| 6,109,745 A | * 8/2000 | Wen ............ 347/101 |
| 6,157,436 A | * 12/2000 | Cok ............ 355/40 |

\* cited by examiner

*Primary Examiner*—Russell Adams
*Assistant Examiner*—Hung Henry Nguyen
(74) *Attorney, Agent, or Firm*—Frank Pincelli

(57) ABSTRACT

A photographic image printer, method of printing, and a software program for printing digital images which analyzes pending orders, determines the image printing sequence, and allocates print media intelligently to enable high printing productivity and low media waste. An apparatus made in accordance with the present invention permits can also provide. In accordance with yet another aspect of the present invention there is provided non-chemistry printing device which requires little floor space.

15 Claims, 3 Drawing Sheets

IMAGE REPRODUCTION APPARATUS WITH COMPACT, LOW-WASTE DIGITAL PRINTER

CROSS-REFERENCE TO RELATED APPLICATIONS

This is a divisional of application Ser. No. 09/470,290, filed Dec. 22, 1999.

FIELD OF THE INVENTION

The present invention is directed to an apparatus for reproducing images, more particularly to a compact image reproducing apparatus that prints images so as to minimize printing time and print material waste.

BACKGROUND OF THE INVENTION

Digital photography is rapidly gaining in popularity, with original images captured both with digital cameras and with conventional cameras and film that is subsequently processed and digitally scanned. Photographic manufacturers have introduced photofinishing apparatus adapted to produce digitally printed images from unprocessed film, processed film, or various digital file inputs. Examples are the QD-21 minilab from Konica, the Frontier™ Digital Lab System from Fuji Photo Film, and the QSST™-2711 from Noritsu Koki. However, all these systems produce prints on silver halide photographic paper, and they therefore require a wet chemical process to produce the color prints. Other systems are known that use processed film or digital files as inputs to produce photographic quality prints without silver halide paper and its accompanying wet process. For example, the Kodak Picture Maker produces thermal dye transfer prints, and the Canon Hyperphoto produces ink jet prints. Both these systems are suitable for a customer making a small number of reprints and enlargements from selected images, but they produce prints too slowly to be practical for standard, multi-image customer orders. The Canon Hyperphoto is further disadvantaged by its large footprint. There is a therefore need for a compact image reproduction apparatus that can rapidly produce high-quality prints without requiring a wet paper process.

U.S. Pat. No. 5,565,902 of Nardone et al. (Atlantek) describes a thermal dye transfer printer configured to print on continuous roll media and sever individual prints while minimizing media waste. The printer of this invention is incapable of printing speeds needed for rapidly fulfilling a multi-image customer order.

U.S. Pat. No. 5,768,675 of E. A. Estabrooks (Intermec) describes an on-demand narrow web electrophotographic printer for printing tickets, labels, etc. with low material waste. The invention is focused on intermittent, on-demand printing of tickets and labels, and as such it does not recognize or address the challenges of rapidly printing a plurality of images associated with one or more customer orders.

U.S. Pat. No. 5,574,831 of R. Grenda generally describes high speed printing using an array of low speed printers and specifically describes various means for collating pages of a single job distributed to multiple printers. In this reference, the printing of individual pages is staggered so that they arrive at the collator in the correct order. Each image is produced on a single page, leading to waste or complexity or both when printing images of differing dimensions. Also, in practice, it is very difficult to calibrate multiple printers to produce uniformly accurate color balance and tone scale. Thus, the color characteristics of a customer's prints produced by such a system would be variable and objectionable.

A printer capable of increasing printing resolution is described in commonly assigned U.S. patent application Ser. No. 09/188,574 of A. Lubinsky, filed Nov. 9, 1998. In one embodiment, the printer prints on a section of media that remains part of a continuous roll. This approach suffers the potential disadvantage of smearing the freshly-printed image or transferring ink to the backside of media contacted by the image as it is rolled up after printing.

U.S. Pat. No. 5,576,794 of J. C. DeMarti, Jr. et al. (Eastman Kodak) describes a photofinishing method in which rolls of films are developed in batches and printed in different batches. For a given roll of film, images are printed in capture order. This reference fails to recognize, let alone solve, the problems associated with low-waste printing of a collection of individual images having different dimensions.

There remains a need for a compact image reproduction apparatus with a dry or apparently-dry digital printer capable of rapidly producing high quality photographic images with low waste.

SUMMARY OF THE INVENTION

It is an object of the present invention to rapidly produce printed images without using the wet chemical processes associated with silver halide print media.

It is a further object of the invention to produced printed images with minimal waste of the print media.

It is a further object of the invention to minimize the time required to produce a customer order comprising a plurality of printed images.

It is a further object of the invention to complete multiple pending customer orders in minimum time.

In accordance with one aspect of the present invention, there is provided an apparatus for printing a plurality of images on a media provided on a supply roll, the media having a predetermined width, comprising:

a scanning print head movable along a predetermined linear path of a first direction, the linear path having a maximum predetermined length;

a transport mechanism for moving the media along a transport so that images can be printed by the scanning print head on the media that is payed out from the supply roll, the transport path being substantially parallel to the linear path; and a computer for analyzing a plurality of digital images with respect to the size and/or shape of the images to be printed and organizing the digital images in a printing sequence and format which determines the length of the media to be payed out for printing from the supply roll so as to provide for the efficient use of the media and efficient use of printing time.

In another aspect of the present invention there is provided an apparatus for printing a plurality of digital images on a media segment having a variable calculated length, comprising:

a printer for printing a digital image at a print gate;

a transport mechanism for moving the media segment a variable calculated length past the print gate so that the print head can print images on the media segment; and a computer for analyzing the customer image order and organizing the plurality images in a printing sequence defining at least one batch of images for placement on the media segment of a variable calculated length and for determining the variable calculated length taking in to consideration the number of images in the customer image order, the maximum length of the platen, and the size of the images to be printed.

In accordance with yet another aspect of the present invention there is provided a method of printing a plurality of images using a sheet of the media of a variable calculated length, comprising the steps of:

a) obtaining a customer image order having a plurality of digital images, each of the digital images having an associated print size; and b) analyzing the customer image order and organizing the plurality images in a printing sequence defining at least one batch of images for placement on the media segment of a variable calculated length and for determining the variable calculated length taking in to consideration the number of images in the customer image order, the maximum length of the platen, and the size of the images to be printed.

In another aspect of the present invention there is provided a method of printing a plurality of images using a media segment, comprising the steps of:

a) obtaining a first customer image order and a second customer image order each having a plurality of digital images, each of the digital images having an associated print size; and b) analyzing the images with respect to the predetermined size so as to determine a printing sequence and format for efficient use of the cut media segment for printing of the digital images.

In accordance with yet still another aspect of the present invention there is provided a computer program product comprising a computer readable storage medium having a computer program thereon which when loaded onto a computer will cause the computer to perform the following steps:

a) obtaining a customer image order having a plurality of digital images, each of the digital images having a selected print size; and b) analyzing the selected print sizes of the images with respect to the predetermined size so as to determine a printing sequence and format on the media segment.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
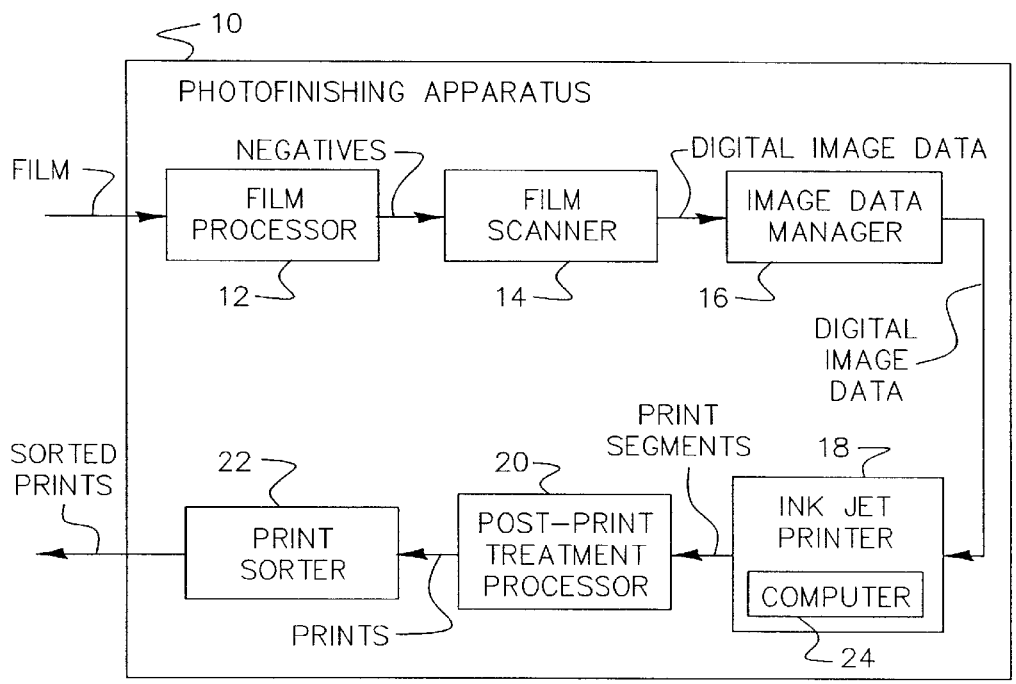
FIG. 1 is a block diagram of a photofinishing apparatus made in accordance with the present invention.

FIG. 1 illustrates a block diagram of a photofinishing apparatus 10 made in accordance with the present invention. In the particular embodiment illustrated, apparatus 10 includes a film processor 12, a scanner 14, an image data manager 16, a printer 18, a post print treatment processor 20 and a print sorter 22. This combination of features in a single apparatus is often referred to as a Minilab. The processor 12 processes exposed undeveloped photosensitive media, such as rolls of photographic film, of a customer order into developed photosensitive media. The photosensitive media in the embodiment illustrated is photographic film (not shown.) However, it is to be understood that the photosensitive media may be of any desired type. Scanner 14 scans the developed images on the film and forwards the digital data of the images on to image data manger 16 for manipulating the images as preprogrammed or otherwise instructed. In particular embodiment illustrated scanner 14 is comprises a plurality of linear CCD (charge couple devices) which digitizes the images from the film. It is to be understood the scanner 14 may comprise any appropriate type scanner for obtaining the digital data of the images. The image data manager 16 performs digital image processing on the digitized images and prepares them for printing. The printer 18 prints the images on media so as to form individual prints. In the embodiment illustrated printer 18 is an inkjet printer. The post print treatment processor 20 performs any operations following printing such as cutting, durability application, drying or back printing. The print sorter 22 sorts the prints for easy distribution back to a customer.

Figure 2:
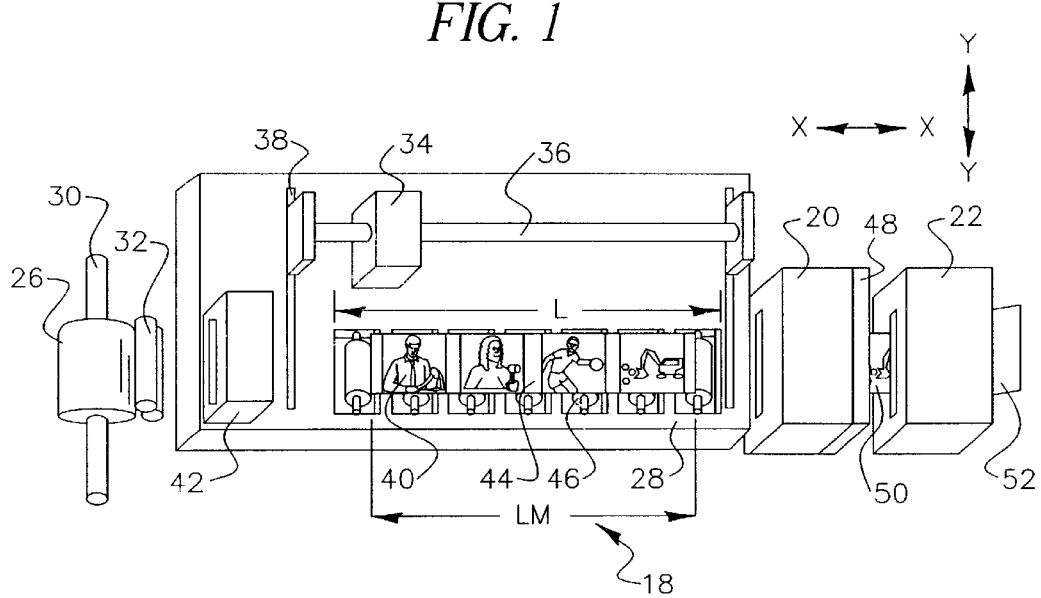
FIG. 2 shows a top view of one embodiment of the printer in the apparatus of FIG. 1.

Referring to FIG. 2 there is illustrated ink jet printer 18 of the apparatus 10 of FIG. 1. The following is a detailed operation of the inkjet printer 18. The first operation to occur is the placement of media segment 26 onto a platen 28. A media supply roll 30 supplies media segment 26 along an axis X-X (herein defined as the fast scan axis.) The media segment 26 is metered out from supply roll 30 onto the platen 28 by means of a media supply transport mechanism 32. In the embodiment illustrated the transport mechanism 32 comprises a pair of pinch rollers 31, 33, one of which is a drive roller. The media is driven by feeding the media between the pinch rollers 31, 33. It is to be understood that the transport mechanism may comprise any other type mechanism capable of transporting the media. The platen 28 has a maximum predetermined length L for receiving of a media segment 26 having a length LM. The media segment 26 can be metered out to any desired length LM up to the maximum length L defined by the platen 28 geometry. Thus, the length LM of segment 26 may be varied to correspond to the actual length needed for the images to be printed for that segment. Preferably, the printer 18 is designed to have a relatively small footprint length, typically equal to or less than about three feet. Thus, the available length L for the platen 28 is limited.

The ink jet printer 18 is now ready to perform a printing operation, which is performed with a series of mechanism movements. First, a scanning print head 34 is provided which can moved along the fast axis X-X in a reciprocating manner by means of a print head fast axis transport mechanism 36. Preferably, the print head 34 moves along fast scan axis X-X a distance such that it can write along the entire length L provided by platen 28 so as to form one line of image data along the entire length. During the slewing (constant velocity) portion of this movement for one traverse of the platen 28, the print head 34 is activated electronically to eject ink drops onto the media 26 positioned on the platen 28. Upon completion of one traverse of the platen 28 by the print head 34 along the along the fast scan axis X-X, the print head 34 can then be moved along the slow axis Y-Y, which is perpendicular to the fast axis X-X and within a plane adjoining the top surface of the platen 28. This motion is an indexing type of motion effected by a slow axis print head transport mechanism 38. Once the indexing motion is complete, the print head 34 can then perform another fast axis motion so as to traverse platen 28 during which printing of another line of image again occurs on the media segment 26. By continuing to alternate these fast scan motions and index movements, the result is a series of printed images 40 on the media 26 resting on the platen 28.

Following the completion of a printing operation, a supply cutter 48 is used to separate the media segment 26 from the supply roll 30 leaving the segment 26 on the platen 28. Having been separated from the supply roll, the media 26 on the platen 28 is now referred to as segment (sheet) 44. This cut segment 44 can now be transported to the post-print treatment processor 20 by means of a post-print treatment transport mechanism 46. Following any post-print treatment, a final chopping is performed on the segment 44 by a cutter 48 and the resulting prints 50 can be sent through the print sorter 22 en route to tray 52.

It should be noted for completeness that the case just described performed the slow axis Y—Y indexing by moving the print head 34. Alternatively, However, cutting of the segment 44 from the supply roll may occur before printing. In this case, the segment 44 and platen 28 may be moved relative to the print head 34 using a platen slow axis transport mechanism.

Some of the main advantages of configuring the photofinishing apparatus 10 as described for the FIG. 2 configurations is that printing of segment 26 and the post-print treatment processor 20 may operate simultaneously thereby improving through put of the apparatus. Preferably the post-print treatment processor 20 is modular with respect to the basic ink jet printer 18 which facilitates, cleaning and maintenance of the post-print treatment processor 20. Also the use of a media supply transport mechanism as described above allows the ink jet printer 18 to only use the print segment length that is required for the images that are being handled by the computer 24 that is part of the ink jet printer 18. This minimizes media waste.

The improved productivity of apparatus 10 discussed here can be measured from a general overall productivity of the photofinishing apparatus basis (i.e., measured over a series of customer orders) or on a per customer order basis. In order to optimize these performance attributes further, the computer 24 (see FIG. 1) within the ink jet printer 18 uses an computer algorithm to analyze the customer orders that are being processed by the image data manager 16. The algorithm analyzes the dimensions of the images to be printed on media segment 26 and performs the distribution or "tiling" of printed images 40 into printing batches for printing the images onto one or more media segments 26.

The Tiling Algorithm can take on many forms. The Tiling Algorithm can be exclusively rule-based. Alternatively, in a preferred embodiment, the Tiling Algorithm uses a Tiling Look-Up-Table (LUT). The Tiling LUT uses the concept is best utilized when there are only a finite number of printed image 40 tiling combinations that can be accommodated by a specific ink jet printer 18. A major factor in the determination of these titling combinations is the maximum amount of printing length capability of length L along the fast scan axis X—X is utilized. Note that length L may not represent the addressable length L because allowance must be made for any waste material that is generated along the fast axis such as spaces between adjacent prints that are cut out and lead and trail edge waste. Another major factor in determining the titling combinations is the defined print format flexibility of the ink jet printer 18. For example, assume that an ink jet printer 18 produces only Advanced Photo System (APS) and standard 35 mm prints in a 4R format. This would mean that only 4 inch×6 inch (Classic, 10.16 cm×15.24 cm), 4 inch×7 inch (HDTV; 10.16 cm×17.78 cm) and 4 inch×11 inch (Panoramic; 10.16 cm×27.94 cm) format prints would be produced. Now assume that the maximum length LM for printing of images on to segment media 26 is 24 inches (60.96 cm) for the supply roll 30. Using these two assumptions, a list of all of the possible "tiling" batches that could be fitted into 24 inches (60.96 cm) can be created. Doing this for this example case results in the combinations listed in Table 1.

TABLE 1

Tiling LUT Example

| Required Segment Print Length (inches) | Tiling Combinations |
|---|---|
| 6 | 1 Classic |
| 7 | 1 HDTV |
| 11 | 1 Panoramic |
| 12 | 2 Classic |
| 13 | 1 Classic and 1 HDTV |
| 14 | 2 HDTV |
| 17 | 1 Classic and 1 Panoramic |
| 18 | 3 Classic or |
|  | 1 HDTV and 1 Panoramic |
| 19 | 2 Classic and 1 HDTV |
| 20 | 2 HDTV and 1 Classic |
| 21 | 3 HDTV |
| 22 | 2 Panoramic |
| 23 | 2 Classic and 1 Panoramic |
| 24 | 4 Classic or |
|  | 1 Classic; 1 HDTV and 1 Panoramic |

Note that Table 1 lists any possible case that could fit onto 24 inches (60.96 cm) of printing length L. What this table represents is the Tiling LUT for the example case. The use of this Tiling LUT now depends on construction of the overall Tiling Algorithm. The Tiling Algorithm preferably takes in to consideration the following factors: can the images from different customer orders be interleaved in their printing sequence, can the printing sequence of images within a customer order be changed, can different customer orders share a segment of media.

Putting these printing possibilities into tabular form results in at least the eight possible configurations shown in Table 2. As can be seen by reference to Table 2, only the first five configurations have any logical use For example, in printing configuration #6 of Table 2, it would not be logically for most situations to allow images from different customer orders to be interleaved in their printing sequence, yet prevent different customer orders from sharing the same print segment.

TABLE 2

Tiling Algorithm Configuration Options

| Config-uration | Interleaved images from different orders? | Re-sequence images within an order? | Adjacent orders share media segments? | Comment |
|---|---|---|---|---|
| #1 | No | No | No | |
| #2 | No | No | Yes | |
| #3 | No | Yes | No | |
| #4 | No | Yes | Yes | |
| #5 | Yes | Yes | Yes | |
| #6 | Yes | Yes | No | Not logical |
| #7 | Yes | No | Yes | Not logical |
| #8 | Yes | No | No | Not logical |

Figure 3:
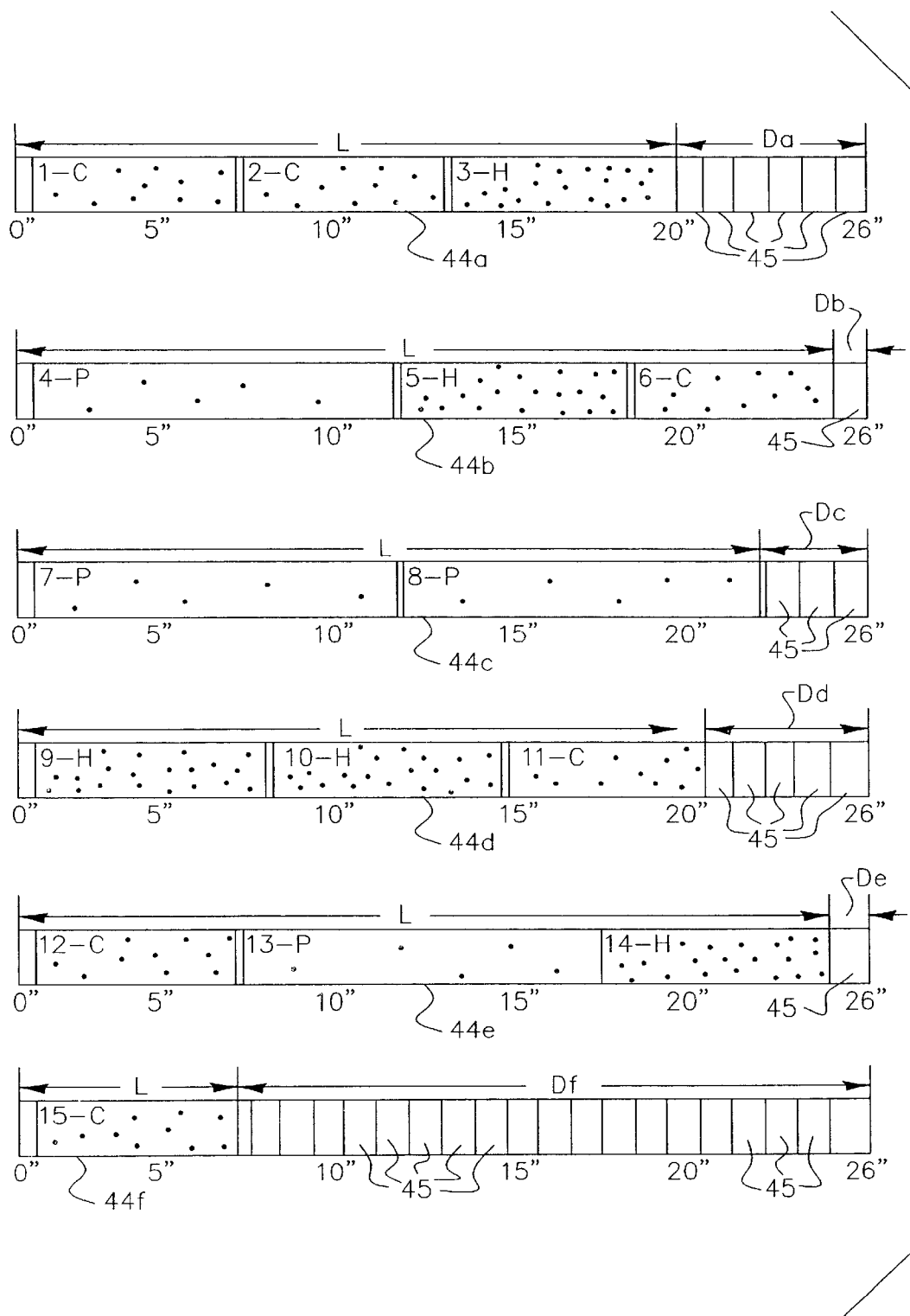
FIG. 3 illustrates a first tiling algorithm for a customer order for the apparatus of FIG. 2.

Reference is now made to the first five printing batches shown in Table 2 and FIG. 3. Tiling Algorithm #1 is an algorithm that operates on a First-In-First-Out (FIFO) process. The computer 24 determines the maximum number of images that can be printed in one segment 44, the fewest number of segments 44 needed and controls the supply of media from supply roll 30 to minimize waste.

Tiling Algorithm #2 also operates on a FIFO basis, but allows two different customer orders to share a media segment. This creates higher productivity and may also decrease waste by reducing the number of printed segments with leading and trailing edges.

Tiling Algorithm #3 allows images within a customer order to be printed in a sequence other than that in which they were captured and/or provided. This is accomplished by using a Tiling LUT. The images for a particular customer order are analyzed from a print format basis. The Tiling LUT is used to maximize the tiling of these images on a given segment length. Prints of the images can then be returned to capture sequence by using the print sorter 22.

Tiling Algorithm #4 allows different customer orders to be printed on the same segment and also allows print sequence to be changed within a customer order. The result of these degrees of freedom is higher productivity measured over all customer orders.

Finally, Tiling Algorithm #5 allows all three degrees of freedom are leverages to maximize productivity: different customer orders may share a print segment 26, print sequence may be varied within a customer order, and the print sequence may also interleave printing of images from different customer orders. The result is enhanced productivity derived from maximizing the probability that the maximum print segment length will be utilized. As in Algorithms #3 and #4, the print sorter 22 can be used to sort prints by customer order and capture sequence within a customer order.

It should be noted that all five batches minimize waste by metering out only as much media that is necessary for printing the required number of images on media segment 26. Where possible it is desired that the longest possible length media segments 26 and fewest media segments 26 be used for each customer order so as to most efficiently use printer 18.

In practice, an operator of the apparatus 10 would select one of the preprogrammed algorithms for use, such as illustrated or that may be developed, taking into account such considerations as simplicity of operation, productivity demands, and capital equipment budget. The five algorithms provide a wide variety of printing sequences. Printing sequence #1 represents the simplest and least capital intensive choice, but provides relatively low productivity. Whereas printing sequence #5 enables the highest productivity and lowest waste, but places high demands on the printer 18 and sorter 22.

Referring to FIG. 3 there illustrated a printing sequence for a single customer order using the Tiling algorithm #1 printing on a segment 44 having a maximum length of 26 inches. In particular the customer order comprises 15 images to be printed, six images having a classic size, five images having a HDTV size, and four images having a panoramic size. As can be seen six segments 44a, 44b, 44c, 44d, 44e, and 44f are needed to print the entire customer order. The length L represents the actual amount of media payed out for printing. The distance Da, Db, Dc, Dd, De, and Df represents the amount of media saved for each of the segments 44a–44f by not metering out a constant length sheet of media.

Figure 4:
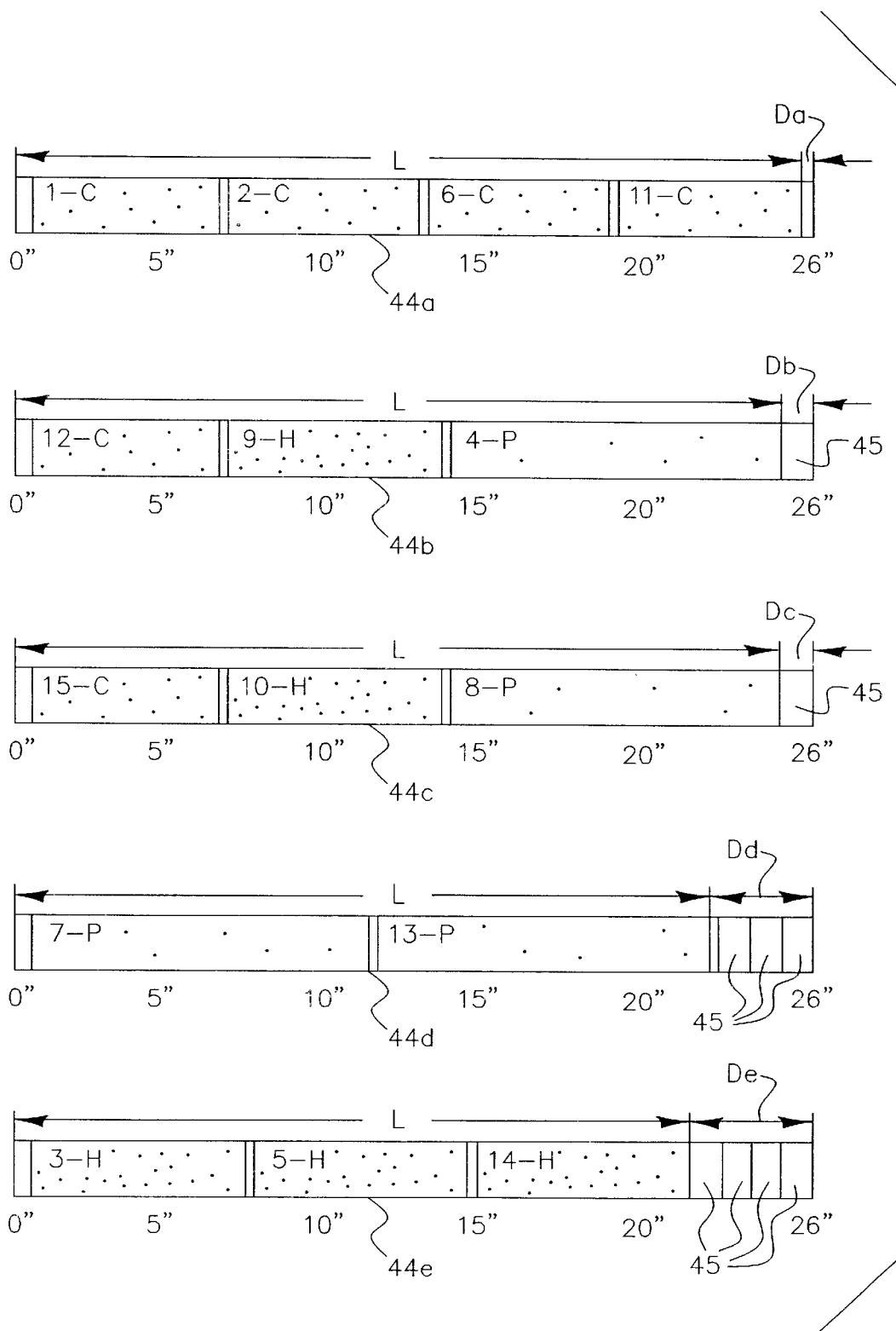
FIG. 4 illustrates a second tiling algorithm for the same customer order of FIG. 3 for the apparatus of FIG. 2.

Referring to FIG. 4 there is illustrated a printing sequence for the same customer order discussed with respect to FIG. 4. However, in this embodiment the Tiling algorithm #5 was used. As a result, only five printing segments 44a, 44b, 44c, 44d, and 44e are needed for printing the entire customer order. Here again, the distance Da, Db, Dc, Dd, and De, represents the amount of media saved of each of the segments 44a–44e by not metering out a constant length sheet of media. As can be seen using Tiling algorithm #5 for a particular customer order uses one less segment than using Tiling algorithm #1.

The preferred format for printing each image is determined using information from various sources. For example, information may be obtained from direct interaction with the customer for specifying print size, number of copies of each image, etc. Images provided to the apparatus in digital form may be accompanied by preferred format, print size, and duplicate information supplied with the digital image. For exposed and processed photographic film, print format can be determined by a simple optical analysis of the dimensions of the exposed frame on the negative film. The apparatus may also utilize print format information encoded on the film, either magnetically or optically. In the case of film with magnetically encoded print format information, the information can be quickly read and analyzed by the microcomputer, enabling image print sequence analysis to begin before high resolution scanning of the film.

The printer 18 may include media in more than one width and means for automatically changing the media roll engaged for printing. The automatic roll changing means may also be used to change rolls of the same width when one has been consumed.

In the preferred form of the present invention, the media is supplied on a continuous roll which can be cut to the desired length so as to minimize waste of media. However, the present can also provide advantages in a printer wherein media is supplied in cut sheet form of a predetermined length. By analyzing the image print order, the printing sequence of the images may be adjusted to best fit the predetermined length of the cut sheet and the other parameters set by the operator of the apparatus. Referring back to FIGS. 3 and 4 illustrates a saving in media waste using algorithm #5 over using algorithm #1, each of the segments 45 representing an incremental distance. In the embodiment illustrated segments 45 represents a distance of one inch (2.54 cm.). Additionally as desired, the travel length which the print head moves can be adjusted to coincide with area of media on which images are to be printed thus further minimizing the travel time of the print head, thereby improving the speed of printing.

It is contemplated to use known techniques for cutting bordered or borderless prints from a printed web or sheet. For example, U.S. Pat. No. 3,831,478 of L. M. Wright et al. describes a cutting mechanism capable of producing either bordered or borderless prints. Alternatively, borderless prints may be separated from a web using the method disclosed in U.S. Pat. No. 3,807,855 of P. P. Zajac, in which the border between adjacent prints is marked prior to print separation. Individual prints may also be separated from a multi-image sheet using methods such as those described in European Patent Application No. 703,497 A1 of B. A. Phillips et al.

For the case in which images are printed in a sequence other than the order in which images were originally captured and/ or provided, the order finishing station may include a print sorter 22 for placing the printed images in the original sequence. The print sorter 22 may also include a back printer for printing the order number and image number on the back of each print, a reading device for reading the order number and image number on the back of each print, and a batch sorter for sorting prints into order number batches with each batch ordered by image number. Such a sorter would allow for reordering image prints using the technologies of U.S. Pat. No. 4,114,349 of Jensen et al. (Pako) and U.S. Pat. No. 5,715,034 of Yamamoto (Noritsu), which collectively address problems of separating orders and joining index prints to their respective orders. The order finishing station may use conventional techniques for automatically collating various parts of a customer order, including the order envelope, processed film, prints, index prints, and media with digital image files.

In particular embodiment illustrated, the images printed on segment 44 all have substantially rectangular shaped images. It is contemplated that the images may take other shapes and/or configurations. For example, the images as illustrated by FIG. 6, image may oval, circular, triangular, or any other desired shape. In these situations the images may be orientated at any desired orientation so as to best utilize media and/or improve the printing efficiency of printer 18.

The apparatus of the present invention may optionally include a film processor as part thereof, typically referred to as a minilab. The film processor may be configured to run the conventional C-41 process for color negative film or any other chemistry for processing the desired photosensitive material. It is specifically contemplated that the film processor may alternatively employ a rapid process cycle, such as that described in U.S. Pat. No. 5,752,122 of Ishikawa. The total time for processing and drying a roll of film is preferably less than three minutes, more preferably less than two minutes, most preferably less than one minute.

The photofinishing apparatus and method of the invention may be combined with known methods of borderless ink jet printing, such as those described in commonly assigned application Ser. No. 09/169,054 of Capurso, filed Oct. 9, 1998, and application Ser. No. 09/118,538 of Wen, filed July 17, 1998.

The ink jet printer utilized in the invention may employ any of various means of providing durable, water-resistant prints. Images may be laminated with a clear plastic material. The formation of images with radiation curable inks, as described in U.S. patent application Ser. No. 08/934,370 of Wen, may be used. Prints may be protected with pre-or post-printing delivery to the print of a fluid layer that subsequently hardens, as described in U.S. Pat. No. 5,376,434 of T. Ogawa et al. (Konica), and U.S. Ser. No. 09/934,370 of Wen. The printer may employ thermal fusing of ink jet media with fusible top layer, as described in U.S. Pat. No. 4,785,313 of M. Higuma (Canon), U.S. Pat. No. 5,374,475 of P. C. Walchli (Celfa), and European Patent Applications 858,905 A1 and 858,906 A1 of K. Misuda et al. Prints may be protected by application and fusing of a clear toner, as described in U.S. Pat. No. 5,804,341 of Bohan et al. (Eastman Kodak). Print protection may also be accomplished by thermal sublimation transfer of a clear layer, as described in U.S. Pat. No. 5,847,738 of Tutt et al. (Eastman Kodak).

While the present invention has been described with reference to a digital ink-jet printer, the present invention may be incorporated into to any type scanning digital printer.

The invention has been described in detail with particular reference to certain preferred embodiments thereof, but it will be understood that variations and modifications can be effected within the spirit and scope of the invention.

TABLE 3

PARTS LIST

| | |
|---|---|
| 10. | photofinishing apparatus |
| 12. | film processor |
| 14. | scanner |
| 16. | image data manager |
| 18. | ink jet printer |
| 20. | post print treatment processor |
| 22. | printer sorter |
| 24. | computer |
| 26. | media segment |
| 28. | platen |
| 30. | supply roll |
| 31. | pinch roller |
| 32. | media supply transport mechanism |
| 33. | pinch roller |
| 34. | print head |
| 38. | transport mechanism |
| 40. | images |
| 44a–44f. | segments (sheets) |
| 45. | segments |
| 46. | post-print treatment transport mech. |
| 48. | supply cutter |
| 50. | prints |
| 52. | tray |

What is claimed is:

1. An apparatus for printing a plurality of individual images provided in a customer image order on to a media, comprising:

a platen having a maximum predetermined length;

a mechanism for providing a plurality of media segments of variable calculated length on to said platen;

a scanning printing mechanism movable relative to said media for printing of said images on said media segments so as to form individual prints of said images, said scanning printing mechanism having a maximum predetermined writing length; and a computer for analyzing said customer image order and organizing said plurality images in a printing sequence defining at least one batch of images for placement on said media segments of a variable calculated length and for determining said variable calculated length taking in to consideration the number of images in said customer image order, the maximum length of said platen, and the size of the images to be printed.

2. An apparatus according to claim 1 wherein said apparatus further comprises a cutting mechanism for separating said individual prints formed on said media during printing of said digital images.

3. An apparatus according to claim 1 wherein said customer image order is printed on a plurality of said media segments.

4. An apparatus according to claim 2 further comprising a sorting mechanism for placing the individual prints cut from said media segment to an order in which the images were originally provided by said customer order.

5. An apparatus according to claim 1 further comprising providing a supply roll of media and a cutter for cutting said supply roll of media into said media segments.

6. An apparatus according to claim 1 wherein said scanning printing mechanism comprises an inkjet head.

7. An apparatus according to claim 3 wherein said media segments all have the same length.

8. An apparatus according to claim 1 wherein at least one digital image printed on said sheet is non-rectangular in shape.

9. An apparatus according to claim 1 wherein at least one of said digital image has a substantially oval shape.

10. An apparatus according to claim 1 further comprising a mechanism for metering said media segments.

11. An apparatus according to claim 1 further comprising a film processor.

12. An apparatus according to claim 1 further comprising a film scanner.

13. An apparatus for printing a plurality of digital images on a media segment having a variable calculated length, comprising:

a printer for printing a digital image at a print gate;

a transport mechanism for moving said media segment a variable calculated length past said print gate so that said print head can print images on said media segment; and a computer for analyzing said customer image order and organizing said plurality images in a printing sequence defining at least one batch of images for placement on said media segment of a variable calculated length and for determining said variable calculated length taking in to consideration the number of images in said customer image order, the maximum length of said platen, and the size of the images to be printed.

14. An apparatus according to claim 13 wherein said printer is a digital printer.

15. An apparatus according to claim 13 wherein said digital printer is an inkjet printer.

* * * * *